(12) United States Patent
Tatemichi et al.

(10) Patent No.: US 8,675,345 B2
(45) Date of Patent: Mar. 18, 2014

(54) FILM FOR FILM CAPACITOR AND FILM CAPACITOR

(75) Inventors: Mayuko Tatemichi, Settsu (JP); Miharu Ota, Settsu (JP); Kouji Yokotani, Settsu (JP); Nobuyuki Komatsu, Settsu (JP); Eri Mukai, Settsu (JP); Meiten Koh, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 287 days.

(21) Appl. No.: 13/141,136

(22) PCT Filed: Dec. 21, 2009

(86) PCT No.: PCT/JP2009/071234
§ 371 (c)(1),
(2), (4) Date: Jun. 21, 2011

(87) PCT Pub. No.: WO2010/074024
PCT Pub. Date: Jul. 1, 2010

(65) Prior Publication Data
US 2011/0255210 A1    Oct. 20, 2011

(30) Foreign Application Priority Data

Dec. 22, 2008  (JP) .................................. 2008-325802
Mar. 17, 2009  (JP) .................................. 2009-064495

(51) Int. Cl.
*H01G 4/08* (2006.01)
*H01G 4/06* (2006.01)

(52) U.S. Cl.
USPC .......................................... 361/323; 361/311

(58) Field of Classification Search
USPC .................................. 361/311, 312–313, 323
See application file for complete search history.

(56) References Cited

U.S. PATENT DOCUMENTS 6,150,456 A * 11/2000 Lee et al. ...................... 524/606
2009/0306264 A1 12/2009 Koh et al.
2010/0105806 A1 * 4/2010 Yang et al. .................... 523/201

FOREIGN PATENT DOCUMENTS

| JP | 01-204959 A | 8/1989 |
| JP | 2008-291152 A | 12/2008 |
| WO | 2007/088924 A1 | 8/2007 |

* cited by examiner

*Primary Examiner* — Eric Thomas
(74) *Attorney, Agent, or Firm* — Sughrue Mion, PLLC

(57) ABSTRACT

There is provided a thin highly dielectric film for a film capacitor being excellent in mechanical strength, in which highly dielectric inorganic particles can be blended to a dielectric resin at high ratio, and rubber particles (B) and preferably highly dielectric inorganic particles (C) are dispersed in a thermoplastic resin (A).

13 Claims, No Drawings

FILM FOR FILM CAPACITOR AND FILM CAPACITOR

CROSS REFERENCE TO RELATED APPLICATIONS

This application is a National Stage of International Application No. PCT/JP2009/071234 filed Dec. 21, 2009, claiming priority based on Japanese Patent Application Nos. 2008-325802 filed Dec. 22, 2008 and 2009-064495 filed Mar. 17, 2009, the contents of all of which are incorporated herein by reference in their entirety.

TECHNICAL FIELD

The present invention relates to a highly dielectric film for a film capacitor and to a film capacitor.

BACKGROUND ART

In recently years, plastic insulating materials are expected as film materials for film capacitors for communication, electronic devices, electric power, medium and low voltage phase advancement and inverter, piezoelectric devices, pyroelectric devices and dielectric materials for transfer printing carrier since they have a high insulation resistance, excellent frequency characteristics and excellent flexibility.

A film capacitor is usually comprised of a film structure comprising a dielectric resin film subjected to aluminum or zinc deposition on its surface, or a film structure comprising multi-layers of aluminum foils and dielectric resin films, and recently there are used a lot of capacitors comprising a dielectric resin film and an electrode formed thereon by metal deposition.

A highly dielectric film for a film capacitor is usually formed in the form of single layer comprising a dielectric resin as a film forming resin, and generally non-fluorine-containing thermoplastic resins such as polyester and polyphenylene sulfide (PPS) and fluorine-containing resins such as vinylidene fluoride (VdF) having high dielectric constant are studied as a film forming resin.

However, since there is a limit in the use of only a resin which is an organic compound for recent demand for high energy density and blending of highly dielectric inorganic particles is carried out (Patent Documents 1 to 4).

PRIOR ART DOCUMENTS

Patent Documents

Patent Document 1: JP-A-2000-294447
Patent Document 2: JP-A-2002-356619
Patent Document 3: JP-A-2007-005531
Patent Document 4: JP-A-2008-034189

DISCLOSURE OF INVENTION

Problem to be Solved by the Invention

Improvements of a dielectric constant and a withstanding voltage of a film have been attempted by uniformly dispersing highly dielectric inorganic particles in a resin. However, when highly dielectric inorganic particles are blended with a dielectric resin at high ratio, mechanical strength, and especially elongation of film itself are reduced. In order to secure desired mechanical strength, the thickness of the film is increased, but there is a problem that the electrostatic capacity is smaller inversely proportional to the thickness of the film. Disadvantageously, the insulation resistance is remarkably reduced at high temperature.

On the other hand, demands of thinned film capacitor are increased, and a thin highly dielectric film for a film capacitor which is excellent in mechanical strength and in which highly dielectric inorganic particles are blended to a dielectric resin at high ratio is also required.

Means to Solve the Problem

The present inventors have made intensive studies to cope with the mentioned demands for improvement in mechanical strength and insulation resistance at high temperatures and as a result, have found that the mentioned problems can be solved by blending rubber particles, and thus have completed the present invention.

Namely, the present invention relates to a highly dielectric film for a film capacitor comprising a thermoplastic resin (A) and rubber particles (B).

An average primary particle size of the rubber particles (B) is preferably from 0.1 to 2.0 μm, and it is preferable that a rubber of the rubber particles (B) is at least one selected from the group consisting of acrylic rubber, butadiene rubber and silicone rubber. Also, it is preferable that the surface of the rubber particles (B) is coated with at least one selected from the group consisting of polymethyl methacrylate and acrylonitrile/styrene copolymer and that the rubber particles (B) are crosslinked rubber particles.

The thermoplastic resin (A) is preferably a vinylidene fluoride (VdF) resin.

It is preferable that the highly dielectric film for a film capacitor of the present invention further comprises highly dielectric inorganic particles (C).

The highly dielectric inorganic particles (C) are at least one selected from the group consisting of:
(C1) compound oxide particles represented by the formula (C1):

$$M^1_{a1}N_{b1}O_{c1}$$

wherein $M^1$ is a metallic element of the group II; N is a metallic element of the group IV; a1 is from 0.9 to 1.1; b1 is from 0.9 to 1.1; c1 is from 2.8 to 3.2; each of $M^1$ and N may be plural,
(C2) compound oxide particles represented by the formula (C2):

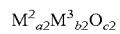

$$M^2_{a2}M^3_{b2}O_{c2}$$

wherein $M^2$ and $M^3$ are different from each other and $M^2$ is a metallic element of the group II in Periodic Table, $M^3$ is a metallic element of the fifth period in Periodic Table; a2 is from 0.9 to 1.1; b2 is from 0.9 to 1.1; c2 is from 2.8 to 3.2, and
(C3) compound oxides particles comprising at least three metallic elements selected from the group consisting of metallic elements of the group II and metallic elements of the group IV in Periodic Table.

With respect to the combination of the thermoplastic resin (A) and the rubber particles (B), preferred are a combination of a VdF resin as the thermoplastic resin (A) and an acrylic rubber as a rubber of the rubber particles (B), a combination of a VdF resin as the thermoplastic resin (A) and a butadiene rubber as a rubber of the rubber particles (B), a combination of a VdF resin as the thermoplastic resin (A) and a silicone rubber as a rubber of the rubber particles (B), and a combination of a VdF resin as the thermoplastic resin (A) and rubber particles, the surface of which is coated with at least one selected from the group consisting of polymethyl methacrylate and acrylonitrile/styrene copolymer as the rubber particles (B).

It is preferable that the film of the present invention comprises the rubber particles (B) in an amount of 1 to 30 parts by mass and the highly dielectric inorganic particles (C) in an amount of 10 to 300 parts by mass based on 100 parts by mass of the thermoplastic resin (A).

A part or the whole of the highly dielectric inorganic particles (C) may be surface-treated highly dielectric inorganic particles obtained by surface-treating highly dielectric inorganic particles (c 1) having a dielectric constant (20° C., 1 kHz) of not less than 100 with a compound (c2) having a low dielectric constant (20° C., 1 kHz) of not more than 10.

The present invention also relates to a highly dielectric film for a laminated film capacitor obtained by providing an insulating resin layer on at least one surface of the highly dielectric film for a film capacitor of the present invention.

Further, the present invention relates to a film capacitor obtained by providing an electrode layer on at least one surface of the highly dielectric film for a film capacitor of the present invention.

Effect of The Invention

The present invention can provide a thin highly dielectric film for a film capacitor being excellent in mechanical strength, in which highly dielectric inorganic particles are blended to a dielectric resin at high ratio.

EMBODIMENT FOR CARRYING OUT THE INVENTION

In the film for a film capacitor of the present invention, the rubber particles (B) and preferably the highly dielectric inorganic particles (C) are dispersed in the thermoplastic resin (A). The film of the present invention can be prepared using a film forming composition comprising the thermoplastic resin (A), the rubber particles (B) and preferably the highly dielectric inorganic particles (C).

Each component is explained below.
(A) Thermoplastic Resin

The thermoplastic resin (A) may be a fluorine-containing thermoplastic resin (a1) and a non-fluorine-containing thermoplastic resin (a2).
(a1) Fluorine-containing thermoplastic resin Examples of the fluorine-containing thermoplastic resin (a1) are vinylidene fluoride (VdF) resin, tetrafluoroethylene/hexafluoropropylene copolymer (FEP), tetrafluoroethylene/perfluoro (alkyl vinyl ether) copolymer (PFA), tetrafluoroethylene/ethylene copolymer (ETFE), and the like, and VdF resin is preferred from the viewpoint of high dielectric constant.

Examples of the VdF resin are a homopolymer (PVdF) of VdF and in addition, copolymers of VdF and one or more of other monomers copolymerizable with VdF, and among these, ones having a dielectric constant of not less than 4, further not less than 6, further not less than 7, especially not less than 8 are preferred from the viewpoint of improvement in withstanding voltage, insulation property and dielectric constant and high dielectric constant when a film is formed.

The VdF resin may be a homopolymer (PVdF) of vinylidene fluoride (VdF) and a copolymer of VdF and other monomers copolymerizable with VdF. Also, the VdF resin may be a blend of VdF homopolymer and a VdF copolymer or may be a blend of VdF copolymers.

Examples of other monomers copolymerizable with VdF are fluorine-containing olefins such as tetrafluoroethylene (TFE), chlorotrifluoroethylene (CTFE), trifluoroethylene (TrFE), monofluoroethylene, hexafluoropropylene (HFP) and perfluoro(alkyl vinyl ether) (PAVE); fluorine-containing acrylates and fluorine-containing monomers having functional group. Among these, TFE, CTFE and HFP are preferred from the viewpoint of good solubility in a solvent. With respect to the copolymerization ratio, VdF is contained in an amount of not less than 50% by mole, preferably not less than 60% by mole, from the viewpoint of high dielectric constant and high solubility in a solvent.

Especially a polymer comprising 60 to 100% by mole of VdF unit, 0 to 40% by mole of TFE unit and 0 to 40% by mole of HFP is preferred since a dielectric constant is not less than 8.

Examples are VdF homopolymer (PVdF), VdF/TFE copolymer, VdF/TFE/HFP copolymer, VdF/HFP copolymer and VdF/CTFE copolymer, and especially from the viewpoint of high dielectric constant and good solubility in a solvent, PVdF, VdF/TFE copolymer and VdF/HFP copolymer are preferred.

In the case of VdF/TFE copolymer, from the viewpoint of high withstanding voltage, it is preferable that VdF unit is contained in an amount of 60 to 95% by mole and TFE unit is contained in an amount of 5 to 40% by mole, and it is especially preferable that VdF unit is contained in an amount of 70 to 90% by mole and TFE unit is contained in an amount of 10 to 30% by mole. Also, in order to decrease dielectric loss of the VdF resin itself, it is preferable to copolymerize ethylene, propylene, alkyl vinyl ether, vinyl acetate, vinyl chloride, vinylidene chloride, $CH_2=CHCF_3$ or $CH_2=CFCF_3$. In that case, since such a copolymerizable monomer is difficult to react directly with VdF, other copolymerizable monomer such as TFE can be copolymerized together. Also, a dielectric constant (20° C., 1 kHz) of the VdF resin is preferably not less than 4, further preferably not less than 6, furthermore preferably not less than 7, especially preferably not less than 8, for further increase in dielectric constant of the film. An upper limit is not limited particularly, and is usually 12, preferably 10.
(a2) Non-fluorine-containing thermoplastic resin Preferred examples of the non-fluorine-containing thermoplastic resin (a2) are cellulose resins since those resins are effective for improvement in dielectric constant and decrease in dielectric loss.

Examples of cellulose resins are ester-modified celluloses such as cellulose monoacetate, cellulose diacetate, cellulose triacetate and cellulose acetate propionate; and ether-modified celluloses such as methyl cellulose, ethyl cellulose and hydroxypropyl methyl cellulose. Among these, cellulose (mono-, di-, tri-)acetate and methyl cellulose are preferred from the viewpoint of low temperature coefficient of dielectric loss.

Examples of preferred non-fluorine-containing thermoplastic resin (a2) other than cellulose resins are polyester resins such as polybutylene terephthalate (PBT), polyethylene terephthalate (PET) and polyethylene naphthalate (PEN); polystyrene resins such as polystyrene and poly(styrene-methacrylate) copolymer; and polyolefin resins such as polyethylene, polypropylene and polycycloolefin, from the viewpoint of good flexibility and processability. Further, in order to increase strength, acrylic resins such as polymethyl methacrylate (PMMA) are preferred. Furthermore, there are polyphenylene sulfide (PPS), polyphenylene oxide (PPO), polyether ketone (PEK) and polyether sulfone (PES) from the viewpoint of good heat resistance. For enhancing insulation property, there are polycarbonate (PC), silicone resin, polyvinyl acetate, epoxy resin, polysulfone (PSF), polyethylene oxide (PEO), polypropylene oxide, polyamide (PA), polyimide (PI), polyamide imide (PAI) and polybenzimidazole (PBI), and for supplementing high dielectric property, there are odd number polyamide, cyanopullulan and copper phthalocyanine polymer.

Among these, from the viewpoint of good solubility in a solvent, at least one selected from the group consisting of cellulose resins, polyester resins, polystyrene resins, polyolefin resins and acrylic resins, especially at least one selected from the group consisting of cellulose resins, polyester resins, polystyrene resins and acrylic resins is preferred.

The non-fluorine-containing thermoplastic resin (a2) may be used blended to the VdF resin (a1), and in that case, characteristics of the respective resins can be effectively exhibited.

In the case of a blend, at least one selected from the group consisting of cellulose resins, polyesters and polymethyl methacrylates is preferred from the viewpoint of good affinity for the VdF resin (a1). In the case of blending a cellulose resin, the proportion of the cellulose resin in the total amount of VdF resin (a1) and cellulose resin is not more than 99.9% by mass from the viewpoint of high dielectric constant and low dielectric loss, preferably not more than 80% by mass from the viewpoint of good mechanical properties. Further, the proportion of the cellulose resin is preferably not less than 0.1% by mass from the viewpoint of low dielectric loss, good mechanical properties and high dielectric constant and is preferably not less than 2% by mass from the viewpoint of low dependency of dielectric loss on temperature.

The non-fluorine-containing thermoplastic resin (a2) may be blended to an extent not to impair high dielectric constant which is a feature of the VdF resin (a1). It is preferable that a ratio (mass ratio) of (a1)/(a2) is 30/70 to 100/0, preferably 70/30 to 100/0.

(B) Rubber Particles

In the present invention, the rubber particles (B) fill the role of giving mechanical strength, especially elongation to the film and impart properties such as rubber elasticity thereto.

Non-limiting examples of rubbers of rubber particles suitable for such a role are diene rubbers such as acrylic rubber, butadiene rubber, silicone rubber, silicon-acryl compound rubber, natural rubber, nitrile rubber, urethane rubber, styrene-butadiene rubber and isoprene rubber; and fluorine-containing rubbers such as VdF-tetrafluoroethylene (TFE) rubber.

Among these, from the viewpoint of high dielectric constant and good dispersibility, acrylic rubber, butadiene rubber and silicone rubber are preferred.

The rubber particles may be so-called core-shell rubber particles obtained by coating the rubber particles with at least one selected from the group consisting of polymethyl methacrylate and acrylonitrile/styrene copolymer. When the core-shell rubber particles are used, good compatibility with the vinylidene fluoride resin is obtained.

In addition, the rubber particles may be un-crosslinked rubber (raw rubber) particles or may be crosslinked rubber particles, and from the viewpoint of good solvent resistance, crosslinked rubber particles are preferred. Crosslinking of rubber may be carried out by known usual method.

An average primary particle size of the rubber particles (B) is preferably 0.1 to 2.0 μm, further preferably 0.15 to 1.5 μm, especially preferably 0.2 to 1.0 μm, from the viewpoint that compatibility between the dispersibility in the resin and the strength of the film can be achieved.

An amount of rubber particles (B) is not less than 1 part by mass, preferably not less than 5 parts by mass, especially preferably not less than 10 parts by mass based on 100 parts by mass of the thermoplastic resin (A). When the amount is too small, an effect of improving mechanical strength, especially elongation of the film tends to be decreased. An upper limit of the amount is 30 parts by mass. When the amount is too large, dispersibility in the resin tends to be inferior. A preferred upper limit of the amount is 20 parts by mass.

(C) Highly Dielectric Inorganic Particles

The highly dielectric inorganic particles (C) can impart higher dielectric constant to the film comprising the thermoplastic resin (A).

The highly dielectric inorganic particles (C) are not limited particularly as far as they are highly dielectric inorganic particles, and are preferably at least one selected from the group consisting of the following (C1) to (C3).

(C1) Compound oxide particles represented by the formula (C1):

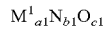

$$M^1{}_{a1}N_{b1}O_{c1}$$

wherein $M^1$ is a metallic element of the group II; N is a metallic element of the group IV; a1 is from 0.9 to 1.1; b1 is from 0.9 to 1.1; c1 is from 2.8 to 3.2; each of $M^1$ and N may be plural.

Preferred examples of a metallic element $M^1$ of the group II are Be, Mg, Ca, Sr and Ba, and preferred examples of a metallic element N of the group IV are Ti and Zr.

Specifically there are exemplified barium titanate, barium zirconate, calcium titanate, calcium zirconate, strontium titanate and strontium zirconate, and especially barium titanate is preferred from the viewpoint of high dielectric constant.

(C2) Compound oxide particles represented by the formula (C2):

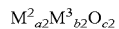

$$M^2{}_{a2}M^3{}_{b2}O_{c2}$$

wherein $M^2$ and $M^3$ are different from each other and $M^2$ is a metallic element of the group II in Periodic Table, $M^3$ is a metallic element of the fifth period in Periodic Table; a2 is from 0.9 to 1.1; b2 is from 0.9 to 1.1; c2 is from 2.8 to 3.2.

Examples of the compound oxide (C2) are magnesium stannate, calcium stannate, strontium stannate, barium stannate, magnesium antimonate, calcium antimonate, strontium antimonate, barium antimonate, magnesium zirconate, calcium zirconate, strontium zirconate, barium zirconate, magnesium indate, calcium indate, strontium indate and barium indate.

(C3) Compound oxides particles comprising at least three metallic elements selected from the group consisting of metallic elements of the group II and metallic elements of the group IV in Periodic Table.

In the compound oxides (C3), examples of metallic elements of the group II in Periodic Table are Be, Mg, Ca, Sr and Ba, and examples of metallic elements of the group IV in Periodic Table are Ti, Zr and Hf.

Examples of preferred combination of three or more elements selected from metallic elements of the group II and metallic elements of the group IV in Periodic Table are a combination of Sr, Ba and Ti, a combination of Sr, Ti and Zr, a combination of Sr, Ba and Zr, a combination of Ba, Ti and Zr, a combination of Sr, Ba, Ti and Zr, a combination of Mg, Ti and Zr, a combination of Ca, Ti and Zr, a combination of Ca, Ba and Ti, a combination of Ca, Ba and Zr, a combination of Ca, Ba, Ti and Zr, a combination of Ca, Sr and Zr, a combination of Ca, Sr, Ti and Zr, a combination of Mg, Sr and Zr, a combination of Mg, Sr, Ti and Zr, a combination of Mg, Ba, Ti and Zr, and a combination of Mg, Ba and Zr.

Examples of the compound oxides (C3) are strontium zirconium titanate, barium zirconium titanate, barium strontium zirconium titanate, magnesium zirconium titanate, calcium zirconium titanate, and barium calcium zirconium titanate.

In addition to these compound oxides particles, other compound oxides particles such as lead zirconium titanate, lead antimonate, zinc titanate, lead titanate and titanium oxide can also be used together.

It is preferable that an average particle size of the highly dielectric inorganic particles (C) is not more than 2 μm, further preferably not more than 1.2 μm, especially from about 0.01 μm to about 0.5 μm, from the viewpoint of surface smoothness of the film and uniform dispersibility.

In addition, a part or the whole of the highly dielectric inorganic particles (C) may be surface-treated highly dielectric inorganic particles obtained by surface-treating highly dielectric inorganic particles (c1) having a dielectric constant (20° C., 1 kHz) of not less than 100 with a compound (c2) having a low dielectric constant (20° C., 1 kHz) of not more than 10.

The highly dielectric inorganic particles (c1) are not limited particularly as far as they are highly dielectric inorganic particles having dielectric constant (20° C., 1 kHz) of not less than 100. A preferred dielectric constant (20° C., 1 kHz) is not less than 500, further preferably not less than 1,000. There is particularly no upper limit of the dielectric constant of the highly dielectric inorganic particles (c1), and an upper limit which can be considered at present is about 3,000.

The highly dielectric inorganic particles (c1) are preferably at least one selected from the group consisting of the above-mentioned (C1) to (C3).

It is preferable that an average particle size of the highly dielectric inorganic particles (c 1) is not more than 2 μm, further preferably not more than 1.2 μm, especially from about 0.01 μm to about 0.5 μm, from the viewpoint of surface smoothness of the film and uniform dispersibility.

The dielectric compound (c2) having low dielectric constant fills the role of improving compatibility with and adhesion to the resin, and insulating property, and is not limited particularly as far as it is a compound having low dielectric constant (20° C., 1 kHz) of not more than 10. This compound may be either an inorganic compound or an organic compound. A preferred dielectric constant (20° C., 1 kHz) is not more than 5, further preferably not more than 4 from the viewpoint that dielectric loss tangent is low and satisfactory, and a further preferred dielectric constant is not more than 3 from the viewpoint of good dielectric property at high temperature. A lower limit of dielectric constant of the dielectric compound (c2) having low dielectric constant is not limited particularly, and is usually about 2.

It is preferable that a difference in dielectric constant between the highly dielectric inorganic particles (c1) and the dielectric compound (c2) having low dielectric constant is not less than 90, further not less than 100, furthermore not less than 200, especially not less than 300, from the viewpoint that highly dielectric property and low dielectric loss tangent can be achieved.

Further, it is preferable that a difference between the dielectric constant (20° C., 1 kHz) of the thermoplastic resin (A) and the dielectric constant (20° C., 1 kHz) of the dielectric compound (c2) having low dielectric constant is not more than 10, further not more than 5, especially not more than 3, from the viewpoint of good dispersibility of the highly dielectric inorganic particles in the thermoplastic resin.

Example of a preferred dielectric compound (c2) having low dielectric constant is at least one organic compound selected from the group consisting of the following (c2a) to (c2e) from the viewpoint of highly dielectric property and low dielectric loss tangent.

(c2a) Organotitanium Compound

Examples of an organotitanium compound are coupling agents such as alkoxy titanium, titanium chelate and titanium acylate, and particularly from the viewpoint of good affinity for the highly dielectric inorganic particles (c1), alkoxy titanium and titanium chelate are preferred.

Examples of the organotitanium compound are tetraisopropyl titanate, titanium isopropoxyoctyleneglycolate, diisopropoxybis(acetylacetonato)titanium, diisopropoxy titanium diisostearate, tetraisopropylbis(dioctylphosphite)titanate, isopropyltri(n-aminoethyl-aminoethyl)titanate, tetra(2,2-diallyloxymethyl-1-butyl)bis(di-tridecyl) phosphite titanate, and the like. From the viewpoint of good affinity for the highly dielectric inorganic particles (c1), tetra(2,2-diallyloxymethyl-1-butyl)bis(di-tridecyl)phosphite titanate is preferred.

(c2b) Organosilane Compound

Examples of an organosilane compound are those of high molecular weight type and low molecular weight type, and from the viewpoint of the number of functional groups, there are coupling agents such as monoalkoxysilane, dialkoxysilane, trialkoxysilane and tetraalkoxysilane. From the viewpoint of good affinity for the highly dielectric inorganic particles (c1), alkoxysilanes of low molecular weight type are preferred.

In addition, vinylsilane, epoxysilane, aminosilane, methacryloxysilane, mercaptosilane and the like can also be suitably used.

(c2c) Organozirconium Compound

Examples of an organozirconium compound are coupling agents such as alkoxyzirconium and zirconium chelate.

(c2d) Organoaluminum Compound

Examples of an organoaluminum compound are coupling agents such as alkoxyaluminum and aluminum chelate.

(c2e) Organophosphorus Compound

Examples of an organophosphorus compound are phosphites, phosphoric acid ester, phosphoric acid chelate and the like.

Among these, at least one selected from the group consisting of alkoxy titanium, titanium chelate and alkoxysilanes is preferred from the viewpoint of good affinity for the highly dielectric inorganic particles (c1).

Non-limiting examples of a method of surface-treating the highly dielectric inorganic particles (c1) with the dielectric compound (c2) having low dielectric constant are as follows.

(Surface-treatment Method 1) Wet Treatment Method

A water soluble organic solvent is added to the highly dielectric inorganic particles (c1), followed by stirring with a high speed stirrer or a homogenizer to prepare a slurry. To this slurry of highly dielectric inorganic particles (c1) is added the dielectric compound (c2) having low dielectric constant diluted with water if necessary, and the mixture is stirred with a high speed stirrer or a homogenizer. Then, the slurry is stirred as it is or while heating. The obtained dispersion is filtrated and subjected to drying treatment to prepare the surface-treated highly dielectric inorganic particles (C). After the drying, when coagulation occurs, pulverization treatment may be carried out with a ball mill or a beads mill.

(Surface-treatment method 2) Dry treatment method

While stirring the highly dielectric inorganic particles (c1) with a mixer such as a dry mixer, a dry beads mill or a Henschel mixer, the dielectric compound (c2) having low dielectric constant diluted with a solvent if necessary is charged in the mixer and the stirring is continued and then the mixture is dried to prepare the surface-treated highly dielectric inorganic particles (C). After the drying, when coagulation occurs, pulverization treatment may be carried out with a ball mill or a beads mill.

The amount of the dielectric compound (c2) having low dielectric constant is preferably 0.1 to 20 parts by mass, further preferably 0.5 to 10 parts by mass, especially preferably 1 to 5 parts by mass based on 100 parts by mass of the highly dielectric inorganic particles (c1). When the amount is too large, there is a case where an excessive amount of the dielectric compound (c2) having low dielectric constant gives an adverse effect on electrical properties, and when the amount is too small, there is high possibility that non-surface-treated highly dielectric inorganic particles (c1) remain.

In the surface-treated highly dielectric inorganic particles (C), a part or the whole of the highly dielectric inorganic particles (c1) is covered with the dielectric compound (c2) having low dielectric constant.

The amount of highly dielectric inorganic particles (C) is not less than 10 parts by mass, preferably not less than 30 parts by mass, especially not less than 50 parts by mass, further not less than 100 parts by mass based on 100 parts by mass of the thermoplastic resin (A). When the amount is too small, an effect of improving dielectric constant of the film becomes small. An upper limit is 300 parts by mass. When the amount is too large, there occurs a problem with strength and surface roughness of the film. A preferred upper limit is 200 parts by mass.

(D) Other Components

In order to enhance affinity of the highly dielectric inorganic particles (C) for the thermoplastic resin (A), an affinity imparting agent may be blended. The affinity imparting agent fills the role of not only uniformly dispersing the highly dielectric inorganic particles (C) in the thermoplastic resin (A) but also firmly bonding the highly dielectric inorganic particles (C) with the thermoplastic resin (A) in the film, thereby enabling generation of voids to be inhibited and dielectric constant to be enhanced.

Examples of advantageous affinity imparting agent are coupling agents, surfactants and epoxy group-containing compounds.

Examples of the coupling agent are, for instance, a titanium coupling agent, a silane coupling agent, a zirconium coupling agent and a zircoaluminate coupling agent.

Examples of the titanium coupling agent are, for instance, those of monoalkoxy type, chelate type and coordinate type, and especially from the viewpoint of satisfactory affinity for the highly dielectric inorganic particles (C), monoalkoxy type and chelate type are preferable.

Examples of the silane coupling agent are, for instance, those of high molecular weight type and low molecular weight type, and from the viewpoint of the number of functional groups, there are monoalkoxysilane, dialkoxysilane, trialkoxysilane and Dipodal alkoxysilane. Especially from the viewpoint of satisfactory affinity for the highly dielectric inorganic particles (C), alkoxysilanes of low molecular weight type are preferred.

Examples of the zirconium coupling agent are, for instance, monoalkoxyzirconium and trialkoxyzirconium.

Examples of the zircoaluminate coupling agent are, for instance, monoalkoxyzircoaluminate and trialkoxyzircoaluminate.

Examples of the surfactant are those of high molecular weight type and low molecular weight type, and from the viewpoint of the kinds of functional groups, there are a nonionic surfactant, an anionic surfactant and a cationic surfactant. Those can be used, and surfactants of high molecular weight type are preferable from the viewpoint of satisfactory thermal stability.

Examples of the nonionic surfactant are, for instance, polyether derivatives, polyvinyl pyrrolidone derivatives and alcohol derivatives, and polyether derivatives are preferable especially from the viewpoint of satisfactory affinity for the highly dielectric inorganic particles (C).

Examples of the anionic surfactant are, for instance, polymers having moiety of sulfonic acid, carboxylic acid or salt thereof, and especially from the viewpoint of satisfactory affinity for the thermoplastic resin (A), preferable are acrylic acid derivative polymers, methacrylic acid derivative polymers, and maleic anhydride copolymers.

Examples of the cationic surfactant are, for instance, amine compounds, compounds having a nitrogen-containing compound ring such as imidazoline, and halogenated salts thereof, and compounds having a nitrogen-containing compound ring are preferable since they have less property of attacking the thermoplastic resin (A). Examples of the salts are ammonium salts having halogen anion such as alkyltrimethylammonium chloride. From the viewpoint of a high dielectric constant, ammonium salts having halogen anion are preferable.

Examples of the epoxy group-containing compound are epoxy compounds and glycidyl compounds, which may be low molecular weight compounds or high molecular weight compounds. Particularly preferable are low molecular weight compounds having one epoxy group from the viewpoint of especially satisfactory affinity for the thermoplastic resin (A). In the present invention, epoxy group-containing coupling agents (for example, epoxysilane) which are classified into a coupling agent are included in the coupling agent but not in the epoxy group-containing compound.

From the viewpoint of especially satisfactory affinity for the thermoplastic resin (A), preferable examples of the epoxy group-containing compound are compounds represented by the formula:

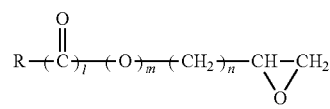

wherein R is hydrogen atom, a monovalent hydrocarbon group having 1 to 10 carbon atoms which may have oxygen atom, nitrogen atom or carbon-carbon double bond, or an aromatic ring which may have a substituent; 1 is 0 or 1; m is 0 or 1; n is 0 or an integer of 1 to 10.

Examples thereof are:

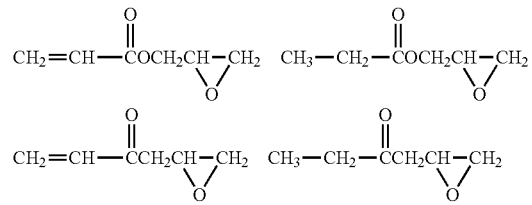

and the like, which have a ketone group or an ester group.

The affinity improving agent can be blended to an extent not to impair the object of the present invention. An amount thereof is from 0.01 to 30 parts by mass, further from 0.1 to 25 parts by mass, especially from 1 to 20 parts by mass based on 100 parts by mass of the highly dielectric inorganic particles (C) since it can be dispersed uniformly and dielectric constant of the obtained film is high.

In the present invention, additives such as other reinforcing filler may be contained as optional components to an extent not to impair the effect of the present invention.

Examples of reinforcing fillers are, for instance, particles and fibers of silica, silicon carbide, silicon nitride, magnesium oxide, potassium titanate, glass, alumina and boron compounds.

In addition, a plasticizer, a leveling agent and a defoaming agent may be added to an extent not to impair the effect of the present invention.

The film forming composition of the present invention can be prepared by mixing the thermoplastic resin (A) (which may contain, if necessary, the other components (D) explained above. Hereinafter, the same), the highly dielectric inorganic particles (C) and the rubber particles (B).

The film can be formed by various known methods, and from the viewpoint of easy operation and good uniformity of the obtained film, it is advantageous to form the film by the coating method (casting method).

In the coating method, the film is formed by any of various coating methods using the coating composition prepared by adding the highly dielectric inorganic particles (C), the rubber particles (B) and if necessary, the other additives (D) to the thermoplastic resin (A) and dissolving or dispersing the mixture in a solvent.

An optional solvent being capable of dissolving or uniformly dispersing the thermoplastic resin (A) can be used as the solvent for the coating, and especially polar organic solvents are preferred. Among polar organic solvents, for example, ketone solvents, ester solvents, carbonate solvents, cyclic ether solvents and amide solvents are preferred. Preferred examples are methyl ethyl ketone, methyl isobutyl ketone (MIBK), acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide (DMF) and dimethylacetamide.

A knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed as the coating method. Among these, a roll coating method, a gravure coating method and a cast coating method are preferred from the viewpoint that operation is easy, non-uniformity of a film thickness is small and productivity is satisfactory.

According to the coating method, since a uniform composition having a high concentration can be prepared and the coating is easy, the thickness of the obtained highly dielectric film can be not more than 20 μm, preferably not more than 15 μm, further not more than 10 μm. A lower limit of the film thickness is about 2 μm from the point of maintaining mechanical strength.

The thus obtained highly dielectric film for a film capacitor of the present invention is a film wherein the highly dielectric inorganic particles (C) and the rubber particles (B) having an average primary particle size of 0.1 to 2.0 μm are dispersed in the thermoplastic resin (A).

In the highly dielectric film for a film capacitor of the present invention, an insulating resin coating layer may be provided on at least one surface of the film for further enhancing insulating property.

This insulating resin coating layer enhances not only low insulating property but also withstanding voltage which have been problems to be solved in a film for a film capacitor comprising highly dielectric inorganic particles. The reason for this is not clear, but it is considered that voltage is applied relatively to a film having thinner thickness due to a partial pressure of voltage, namely, high voltage is applied to the insulating resin having high insulating property, thereby decreasing a voltage load on the film.

In the case of providing the insulating resin coating layer on one surface of the film, it is advantageous with the view of enhancing insulating resistance and maintaining high dielectric constant, and in the case of providing the insulating resin coating layer on both surfaces of the film, it is advantageous with the view of enhancing insulating property more.

It is preferable that the insulating resin constituting the insulating resin coating layer is a non-fluorine-containing resin having a volume resistivity of not less than $10^{13}$ Ω·cm, preferably not less than $10^{14}$ Ω·m, especially not less than $10^{15}$ Ω·m from the viewpoint of excellent effect of enhancing insulating property and withstanding voltage. An upper limit of the volume resistivity is preferably as large as possible since higher insulating property (high volume resistivity) is preferred.

From this point of view, examples of the resin are cellulose resins, polyester resins, polystyrene resins, polyolefin resins and acrylic resins. Examples thereof are the same as those exemplified in the explanation of the non-fluorine-containing thermoplastic resin (a2).

Furthermore, there are polyphenylene sulfide (PPS), polyphenylene oxide (PPO), polyether ketone (PEK) and polyether sulfone (PES) from the viewpoint of good heat resistance. For enhancing insulation property, there are polycarbonate (PC), silicone resin, polyvinyl acetate, epoxy resin, polysulfone (PSF), polyethylene oxide (PEO), polypropylene oxide, polyamide (PA), polyimide (PI), polyamide imide (PAI) and polybenzimidazole (PBI).

From another point of view, the resin is preferably a non-fluorine-containing resin being soluble in a solvent from the viewpoint that the insulating resin layer is easily formed.

Especially, preferred example is at least one selected from the group consisting of cellulose resins, polyester resins and polystyrene resins.

The insulating resin layers may be composed of only the insulating resin or other additives may be contained therein.

Examples of the other additives are a plasticizer, a leveling agent, a defoaming agent, an antioxidant, an antistatic agent, a flame retardant, inorganic oxides such as barium titanate and rubber fine particles. The kinds and amounts thereof can be selected to an extent not to impair effects of enhancing the insulating property and the withstanding voltage as effects of the present invention.

The insulating resin layer used in the present invention can be laminated (formed) on a film using the above insulating resins (including non-fluorine-containing resin compositions comprising other additives mentioned above, if necessary. Hereinafter, the same) by the conventional melt extrusion method and coating method. It is advantageous to laminate the resin layer by the coating method (casting method) from the viewpoint that the operation is easy and the obtained laminated film has good uniformity.

In the coating method, a film is prepared from a coating composition obtained by adding, if necessary, other additives to the insulating resin and dissolving or dispersing the mixture in a solvent, according to various coating methods.

Some solvents which can dissolve the insulating resin can be used as the solvent for forming the insulating resin layer. In the cases where solvents having affinity for the thermopalstic resin (A), especially VdF resin are used, an insulating resin layer having good adhesion and durability can be formed.

Preferred solvents are polar organic solvents. Among these, especially, ketone solvents, ester solvents, carbonate solvents, cyclic ether solvents and amide solvents are preferred. Preferred examples are methyl ethyl ketone, methyl isobutyl ketone, acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide and dimethylacetamide. A knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed as the coating method. Among these, a roll coating method, a gravure coating method and a cast coating method are preferred from the viewpoint that operation is easy, non-uniformity of a film thickness is small and productivity is satisfactory.

The thickness of the obtained insulating resin layer is preferably not more than 0.5 μm, still preferably not more than 1 μm, further preferably not more than 2 μm from the view of good insulating property and improved withstanding voltage. The upper limit is 5 μm, preferably 3 μm from the view of maintaining high dielectric property.

A film capacitor can be prepared by laminating an electrode layer on at least one surface of the highly dielectric film of the present invention.

Examples of structures of film capacitors are those of laminated type in which electrode layers and highly dielectric films are laminated alternately (JP-A-63-181411, JP-A-3-18113) and of rolled type in which a high dielectric film and electrode layer in the tape form are rolled up (one disclosed in JP-A-60-262414, in which an electrode is not laminated continuously on a highly dielectric film, and one disclosed in JP-A-3-286514, in which an electrode is laminated continuously on a highly dielectric film). In the case of the rolled type film capacitor in which the structure is simple, the preparation is relatively easy and an electrode layer is laminated continuously on a highly dielectric film, generally the film capacitor is produced by rolling two highly dielectric films having an electrode laminated on one surface thereof so that the electrodes do not come into contact to each other, and after rolling, fixing the films so as not to get loose after rolling, if necessary.

The electrode layer is not limited particularly, and is a layer generally composed of conductive metals such as aluminum, zinc, gold, platinum and copper and used in the form of a metal foil or a deposited metal film. In the present invention, either a metal foil or a deposited metal film may be used or the both may be used together. Usually a deposited metal film is preferred from the viewpoint that thinner electrode layers can be prepared, and as a result, the capacity can be increased for its volume, the adhesion to dielectric materials is excellent and non-uniformity of thickness is small. A deposited metal film is not limited to those having a single layer, and, if necessary, may be those having multi-layers prepared, for example, by a method in which an electrode is formed by laminating semi-conductive aluminum oxide on an aluminum layer in order to provide the moisture resistance (for example, JP-A-2-250306). The thickness of the deposited metal film also is, but not limited particularly to, preferably from 100 to 2,000 angstrom, more preferably from 200 to 1,000 angstrom. When the thickness of the deposited metal film is within this range, it is suitable since the capacity and strength of the capacitor are balanced.

When a deposited metal film is used as an electrode layer, a method for forming a film is not particularly limited, and for example, a vacuum deposition method, a sputtering method, an ion plating method or the like can be employed. Usually a vacuum deposition method is used.

Examples of the vacuum deposition method are those of a batch type for molded articles and a semi-continuous type and air to air type for long articles, and currently the semi-continuous type vacuum deposition method is mainly employed. The semi-continuous type metal deposition method is a method comprising metal-depositing a film in a vacuum system, rolling the metal-deposited film, exposing the vacuum system to atmosphere and removing the deposited film.

Specifically, a semi-continuous type method can be carried out according to a method described in Japanese Patent No. 3664342 with reference to FIG. 1 thereof.

In the case where a metal film layer is formed on a high dielectric film, the surface of the high dielectric film can be previously subjected to treatment for improvement of adhesion such as corona treatment, plasma treatment or the like. Also in the case where a metal foil is used as an electrode layer, the thickness of the metal foil is not limited particularly, and is usually 0.1 to 100 μm, preferably 1 to 50 μm, more preferably 3 to 15 μm.

A fixing method is not particularly limited, and both of fixing and protection of a structure may be concurrently carried out, for example, by sealing with a resin or by sealing in an insulation case. Method for connecting a lead wire is also not limited, and the lead wire is fixed by welding, ultrasonic pressure welding or forge welding or with an adhesive tape. A lead wire may be connected to an electrode before rolling a film. In the case of sealing in an insulation case, an opening may be sealed with a thermosetting resin such as a urethane resin or an epoxy resin to prevent degradation by oxidation, if necessary.

In the case where the highly dielectric film of the present invention is of the laminated type having an insulating resin coating layer, the electrode layer may be provided on the insulating resin coating layer or on the other surface of the film.

The thus obtained film capacitor has a high dielectric property, a high insulation property and a high withstanding voltage and superior mechanical strength, especially, elongation.

EXAMPLE

The present invention is then explained by means of examples, but is not limited thereto.

The characteristic values used in the present invention are measured by the following methods.

(Thickness)

The thickness of a film on a substrate is measured at room temperature using a digital length meter (MF-1001 available from Sendai Nikon Corporation). In the case where the insulating resin coating layer is provided, the thickness of the insulating resin coating layer is a thickness which is obtained by subtracting the thickness of the film from the whole thickness of completed laminated type film, in which the whole thickness of completed laminated type film is measured in the same manner as the film.
(Dielectric Loss and Dielectric Constant)

A sample is prepared by aluminum-depositing the multi-layered film on both surfaces thereof in vacuo. An electrostatic capacity and a dielectric loss tangent of this sample are measured under atmospheric dry air, at a frequency of 100 Hz, 1 kHz and 10 kHz, at room temperature (20° C.) and at 80° C. using an LCR meter (ZM2353 available from NF Corporation). The dielectric constant and dielectric loss (%) are calculated from the obtained electrostatic capacity and dielectric loss tangent.
(Electrical Insulating Property)

A volume resistivity ($\psi \cdot cm$) is measured at 500V DC under atmospheric dry air using a digital super megohmmeter/microammeter.
(Withstanding Voltage)

A withstanding voltage of the film on a substrate is measured under atmospheric dry air using a withstanding voltage/insulation resistance tester (TOS9201 available from KIKUSUI ELECTRONICS CORP). The voltage increasing rate at the measurement is 100 V/s.
(Mechanical Strength)

The tensile elongation at break (%) is measured by a tensile tester (RTC-1225A available from ORIENTEC Corporation).

Example 1

Into a 1-liter separable flask were poured 640 parts by mass of N,N-dimethylacetamide (DMAc) (available from Kishida Chemical Co., Ltd.) and 160 parts by mass of polyvinylidene fluoride (PVdF) (KAYNAR761 available from ARKEMA, 9.2 of dielectric constant (1 kHz, 20° C.)), and the mixture was stirred at 80° C. for 3 hours using a three-one motor to obtain a PVdF solution having a concentration of 20% by mass. This PVdF solution was a uniform transparent solution.

Into 20 parts by mass of the obtained PVdF solution were added 0.8 part by mass of rubber particles in which a core was an acrylic rubber and a shell was polymethyl methacrylate (EXL 2313 available from Rohm and Haas Japan K.K., 0.6 μm of average primary particle size, rubber particles No. 1), 4 parts by mass of DMAc and 16 parts by mass of methyl isobutyl ketone (MIBK) (available from Kishida Chemical Co., Ltd.). Into the mixture were added the same parts by mass of zirconia beads having a diameter of 1 mm and then the resultant is charged into a bench-top planetary ball mill (Planet M available from Gokin Planetaring Inc.), followed by a dispersing treatment at 600 rpm at room temperature for 10 minutes. The zirconia beads were removed from the dispersion-treated mixture through a stainless steel mesh (a 80 mesh available from MANABE KOGYO CO., LTD.) to prepare a rubber dispersion as a film forming composition. The composition was cast on a 38 μm thick PET film subjected to releasing treatment using a micro gravure coater and passed through a 6m-drying oven at 150° C. and then a 6m-drying oven at 180° C. to form a cast film having 6.8 μm of a thickness on the PET film. Subsequently, a VdF resin film for a film capacitor having 6.8 μm of a thickness was obtained by removing the cast film from the PET film.

For the obtained film, the volume resistivity, the withstanding voltage, the tensile elongation at break, the dielectric loss and dielectric constant at frequencies (100 Hz, 1 kHz and 10 kHz) at 20° C. and 80° C. were calculated. The results are shown in Table 1.

Example 2

A VdF resin film for a film capacitor having 7.0 μm of a thickness was obtained in the same manner as in Example 1 except that rubber particles, in which a core was a butadiene rubber and a shell was polymethyl methacrylate (KCA 801N available from Rohm and Haas Japan K.K., 0.2 μm of average primary particle size, rubber particles No. 2), were used.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 1.

Example 3

A VdF resin film for a film capacitor (VdF/TFE copolymer) having 7.1 μm of a thickness was obtained in the same manner as in Example 1 except that the VdF/TFE copolymer (VP-50 available from Daikin Industries, Ltd., 8.4 of dielectric constant (1 kHz, 20° C.)) was used instead of PVdF.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 1.

Comparative Example 1

A highly dielectric film was prepared in the same manner as in Example 1 except that rubber particles were not blended.

For the obtained highly dielectric film for comparison, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 1.

TABLE 1

|  | Ex. 1 | Ex. 2 | Ex. 3 | Com Ex. 1 |
|---|---|---|---|---|
| Composition (part by mass) Thermoplastic resin | | | | |
| PVdF | 100 | 100 | — | 100 |
| VdF/TFE | — | — | 100 | — |
| Rubber particles | | | | |
| No. 1 | 20 | — | 20 | — |
| No. 2 | — | 20 | — | — |
| Film thickness (μm) | 6.8 | 7.0 | 7.1 | 7.0 |
| Volume resistivity (Ω · cm) | | | | |
| (20° C.) | $1.5 \times 10^{14}$ | $1.5 \times 10^{14}$ | $7.5 \times 10^{13}$ | $1.2 \times 10^{14}$ |
| (80° C.) | $7.1 \times 10^{13}$ | $6.4 \times 10^{13}$ | $2.4 \times 10^{13}$ | $2.5 \times 10^{13}$ |
| Withstanding voltage (V/μm) | 570 | 550 | 500 | 500 |
| Tensile elongation at break (%) | 82 | 75 | 110 | 50 |
| Temperature at measurement | (20° C.) (80° C.) | (20° C.) (80° C.) | (20° C.) (80° C.) | (20° C.) (80° C.) |

TABLE 1-continued

| | Ex. 1 | | Ex. 2 | | Ex. 3 | | Com Ex. 1 | |
|---|---|---|---|---|---|---|---|---|
| Dielectric constant | | | | | | | | |
| 100 Hz | 7 | 10 | 7 | 9 | 9 | 10 | 11 | 14 |
| 1 kHz | 7 | 9 | 7 | 9 | 9 | 9 | 10 | 13 |
| 10 kHz | 7 | 8 | 7 | 8 | 8 | 9 | 10 | 11 |
| Dielectric loss (%) | | | | | | | | |
| 100 Hz | 3.3 | 9.9 | 3.5 | 9.5 | 2.3 | 4.2 | 5.9 | 6.2 |
| 1 kHz | 1.8 | 10.1 | 2.0 | 9.7 | 1.9 | 3.0 | 3.1 | 9.2 |
| 10 kHz | 2.2 | 5.8 | 2.3 | 6.0 | 1.9 | 2.9 | 2.9 | 8.4 |

Table 1 shows that the withstanding voltage, the volume resistivity and the elongation are improved by blending the rubber particles compared with those in the case of using VdF resin only.

Example 4

Into a 1-liter separable flask were poured 640 parts by mass of N,N-dimethylacetamide (DMAc) (available from Kishida Chemical Co., Ltd.) and 160 parts by mass of polyvinylidene fluoride (PVdF) (KAYNAR761 available from ARKEMA, 9.2 of dielectric constant (1 kHz, 20° C.)), and the mixture was stirred at 80° C. for 3 hours using a three-one motor to obtain a PVdF solution having a concentration of 20% by mass. The PVdF solution was a uniform transparent solution.

Furthermore, 18 parts by mass of barium calcium zirconium titanate (BCTZ available from Nippon Chemical Industrial, Co., Ltd., 1,000 of dielectric constant (1 kHz, 20° C.) having 1 μm of an average particle size was added to 9 parts by mass of DMAc, 5 parts by mass of methyl isobutyl ketone (MIBK) (available from Kishida Chemical Co., Ltd.) and 2 parts by mass of the above PVdF solution having a concentration of 20% by mass. Into the mixture was added the same mass of zirconia beads having a diameter of 1 mm, and the resultant was charged into a bench-top planetary ball mill (Planet M available from Gokin Planetaring Inc.), followed by dispersion treatment at 800 rpm for 5 minutes under room temperature. Subsequently, into the obtained mixture was added 2 parts by mass of rubber particles No. 1 in which a core was an acrylic rubber and a shell was polymethyl methacrylate, followed by dispersion treatment at 800 rpm for 10 min. The zirconia beads were removed from the dispersion-treated mixture through a stainless steel mesh (a 80 mesh available from MANABE KOGYO CO., LTD.) to obtain as a compound oxide dispersion solution. 34 Parts by mass of this dispersion solution, 50 parts by mass of the above PVdF solution (containing 10 parts by mass of PVdF and 40 parts by mass of DMAc) and 26.7 parts by mass of MIBK were mixed to prepare a film forming composition.

The composition was cast on a 38 μm thick PET film subjected to releasing treatment using a micro gravure coater and passed through a 6m-drying oven at 150° C. and then a 6m-drying oven at 180° C. to obtain a laminated film in which a cast film having 7.7 μm of a thickness was formed on the PET film. Subsequently, a VdF resin film for a film capacitor having 7.7 μm of a thickness was obtained by removing the cast film from the PET film.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

Example 5

A VdF resin film for a film capacitor having 8.0 μm of a thickness was obtained in the same manner as in Example 4 except that rubber particles No. 2 in which a core was a butadiene rubber and a shell was polymethyl methacrylate were used as rubber particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

Example 6

A VdF resin film for a film capacitor having 7.3 μm of a thickness was obtained in the same manner as in Example 4 except that rubber particles in which a core was a silicon-acryl compound rubber and a shell was an acrylonitrile/styrene copolymer (SX-005 available from Mitsubishi Rayon Co., Ltd., 0.2 μm of an average primary particle size, rubber particles No. 3) were used as rubber particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

Example 7

A VdF resin film for a film capacitor having 7.1 μm of a thickness was obtained in the same manner as in Example 4 except that rubber particles in which a core was an acrylic rubber and a shell was a polymethyl methacrylate (EX2315 available from Rohm and Haas Japan K.K., 0.3 μm of an average primary particle size, rubber particles No. 4) were used as rubber particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

Example 8

A VdF resin film for a film capacitor having 7.3 μm of a thickness was obtained in the same manner as in Example 4 except that rubber particles No. 5 in which a core was a butadiene rubber and a shell was polymethyl methacrylate (KW4426 available from
Mitsubishi Rayon Co., Ltd., 0.5 to 1.0 μm of an average primary particle size) were used as rubber particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

Comparative Example 2

A highly dielectric film was prepared in the same manner as in Example 4 except that rubber particles were not blended.

For the obtained highly dielectric film for comparison, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 2.

except that the amount of rubber particles No. 1 was changed to 0.2 part by mass (5 parts by mass based on 100 parts by mass of PVdF).

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 3.

Example 10

A VdF resin film for a film capacitor having 8.6 μm of a thickness was obtained in the same manner as in Example 4 except that the amount of rubber particles No. 1 was changed to 1.0 part by mass (10 parts by mass based on 100 parts by mass of PVdF).

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 3.

Example 11

A VdF resin film for a film capacitor having 6.6 μm of a thickness was obtained in the same manner as in Example 4

TABLE 2

|  | Ex. 4 | | Ex. 5 | | Ex. 6 | | Ex. 7 | | Ex. 8 | | Com Ex. 2 | |
|---|---|---|---|---|---|---|---|---|---|---|---|---|
| Composition (part by mass) Thermoplastic resin | | | | | | | | | | | | |
| PVdF | 100 | | 100 | | 100 | | 100 | | 100 | | 100 | |
| Highly dielectric inorganic particles | | | | | | | | | | | | |
| Barium calcium zirconium titanate | 175 | | 175 | | 175 | | 175 | | 175 | | 175 | |
| Rubber particles | | | | | | | | | | | | |
| No. 1 | 20 | | — | | — | | — | | — | | — | |
| No. 2 | — | | 20 | | — | | — | | — | | — | |
| No. 3 | — | | — | | 20 | | — | | — | | — | |
| No. 4 | — | | — | | — | | 20 | | — | | — | |
| No. 5 | — | | — | | — | | — | | 20 | | — | |
| Film thickness (μm) | 7.7 | | 8.0 | | 7.3 | | 7.1 | | 7.3 | | 6.3 | |
| Volume resistivity (Ω · cm) | | | | | | | | | | | | |
| (20° C.) | $5.5 \times 10^{14}$ | | $3.6 \times 10^{14}$ | | $5.5 \times 10^{14}$ | | $3.1 \times 10^{14}$ | | $4.3 \times 10^{14}$ | | $1.0 \times 10^{14}$ | |
| (80° C.) | $2.3 \times 10^{14}$ | | $1.4 \times 10^{14}$ | | $1.9 \times 10^{14}$ | | $1.1 \times 10^{14}$ | | $1.0 \times 10^{14}$ | | $3.0 \times 10^{13}$ | |
| Withstanding voltage (V/μm) | 250 | | 220 | | 220 | | 240 | | 230 | | 200 | |
| Tensile elongation at break (%) | 41 | | 29 | | 37 | | 34 | | 42 | | 22 | |
| Temperature at measurement | (20° C.) | (80° C.) | (20° C.) | (80° C.) | (20° C.) | (80° C.) | (20° C.) | (80° C.) | (20° C.) | (80° C.) | (20° C.) | (80° C.) |
| Dielectric constant | | | | | | | | | | | | |
| 100 Hz | 28 | 37 | 29 | 37 | 26 | 34 | 30 | 37 | 27 | 35 | 39 | 50 |
| 1 kHz | 27 | 32 | 28 | 32 | 25 | 29 | 29 | 33 | 26 | 32 | 37 | 43 |
| 10 kHz | 26 | 28 | 27 | 28 | 24 | 26 | 28 | 29 | 26 | 31 | 36 | 38 |
| Dielectric loss (%) | | | | | | | | | | | | |
| 100 Hz | 5.5 | 7.8 | 4.5 | 8.0 | 4.7 | 7.9 | 4.3 | 7.5 | 3.1 | 6.0 | 5.2 | 7.4 |
| 1 kHz | 2.9 | 10.8 | 2.1 | 10.6 | 2.4 | 10.4 | 2.4 | 9.5 | 2.0 | 4.1 | 2.5 | 10.0 |
| 10 kHz | 2.4 | 7.4 | 1.8 | 6.2 | 1.9 | 6.3 | 2.0 | 5.7 | 2.1 | 4.5 | 2.0 | 7.1 |

Table 2 shows that the withstanding voltage, the volume resistivity and the elongation are improved by blending the rubber particles even when highly dielectric inorganic particles are blended.

Example 9

A VdF resin film for a film capacitor having 6.9 μm of a thickness was obtained in the same manner as in Example 4 except that the amount of barium calcium zirconium titanate was changed to 5.1 parts by mass (50 parts by mass based on 100 parts by mass of PVdF).

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 3.

Example 12

A VdF resin film for a film capacitor having 7.2 μm of a thickness was obtained in the same manner as in Example 4 except that the amount of barium calcium zirconium titanate was changed to 25.7 parts by mass (250 parts by mass based on 100 parts by mass of PVdF).

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 3.

Example 13

A VdF resin film for a film capacitor having 7.5 μm of a thickness (VdF/TFE copolymer) was obtained in the same manner as in Example 4 except that the VdF/TFE copolymer (VP-50 available from Daikin Industries, Ltd., 8.4 of dielectric constant (1 kHz, 20° C.)) was used instead of PVdF.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 3.

tries Ltd.) and the mixture was stirred at 80° C. for 3 hours using a mechanical stirrer to obtain an AC solution having a concentration of 20% by mass.

A compound oxide dispersion, and further a film forming composition were prepared in the same manner as in Example 4 except that the AC solution was used instead of the PVdF solution.

The composition was cast on a 38 μm thick PET film subjected to releasing treatment using a micro gravure coater and passed through a 6m-drying oven at 150° C. and then a 6m-drying oven at 180° C. to obtain a laminated film in which a cast film having 7.8 μm of a thickness was formed on the PET film. Subsequently, an AC resin film for a film capacitor having 7.8 μm of a thickness was obtained by removing the cast film from the PET film.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 4.

Example 15

Into a 3-liter separable flask were poured 640 parts by mass of N,N-dimethylacetamide (DMAc) (available from Kishida

TABLE 3

| | Ex. 9 | | Ex. 10 | | Ex. 11 | | Ex. 12 | | Ex. 13 | |
|---|---|---|---|---|---|---|---|---|---|---|
| Composition (part by mass) | | | | | | | | | | |
| Thermoplastic resin | | | | | | | | | | |
| PVdF | 100 | | 100 | | 100 | | 100 | | — | |
| VdF/TFE | — | | — | | — | | — | | 100 | |
| Highly dielectric inorganic particles | | | | | | | | | | |
| Barium calcium zirconium titanate | 175 | | 175 | | 50 | | 250 | | 175 | |
| Rubber particles | | | | | | | | | | |
| No. 1 | 5 | | 10 | | 20 | | 20 | | 20 | |
| Film thickness (μm) | 6.9 | | 8.6 | | 6.6 | | 7.2 | | 7.5 | |
| Volume resistivity (Ω · cm) | | | | | | | | | | |
| (20° C.) | $2.3 \times 10^{14}$ | | $2.3 \times 10^{14}$ | | $1.4 \times 10^{14}$ | | $4.5 \times 10^{14}$ | | $8.1 \times 10^{13}$ | |
| (80° C.) | $8.5 \times 10^{13}$ | | $9.1 \times 10^{13}$ | | $9.3 \times 10^{13}$ | | $3.0 \times 10^{14}$ | | $1.8 \times 10^{13}$ | |
| Withstanding voltage (V/μm) | 240 | | 230 | | 270 | | 230 | | 210 | |
| Tensile elongation at break (%) | 25 | | 34 | | 45 | | 28 | | 32 | |
| Temperature at measurement | (20° C.) | (80° C.) | (20° C.) | (80° C.) | (20° C.) | (80° C.) | (20° C.) | (80° C.) | (20° C.) | (80° C.) |
| Dielectric constant | | | | | | | | | | |
| 100 Hz | 35 | 44 | 32 | 41 | 13 | 15 | 35 | 45 | 29 | 33 |
| 1 kHz | 32 | 38 | 31 | 35 | 13 | 14 | 34 | 41 | 28 | 31 |
| 10 kHz | 32 | 34 | 30 | 31 | 13 | 14 | 32 | 36 | 28 | 29 |
| Dielectric loss (%) | | | | | | | | | | |
| 100 Hz | 4.3 | 9.0 | 3.8 | 9.9 | 4.4 | 8.6 | 4.5 | 7.5 | 2.6 | 4.3 |
| 1 kHz | 2.3 | 9.9 | 2.1 | 10.1 | 2.5 | 10.3 | 2.6 | 9.5 | 2.1 | 4.2 |
| 10 kHz | 2.2 | 6.5 | 2.1 | 5.2 | 2.4 | 6.2 | 2.5 | 6.2 | 2.0 | 3.1 |

Table 3 shows that the more the rubber particles are blended, the more the elongation is improved. It is also shown that even when the blend amount of highly dielectric inorganic particles are increased (Example 12), the required withstanding voltage, electrical insulating property and elongation are assured.

Example 14

Into a 3-liter separable flask were poured 640 parts by mass of N,N-dimethylacetamide (DMAc) (available from Kishida Chemical Co., Ltd.) and 160 parts by mass of cellulose acetate (AC) (L-20 available from Daicel Chemical Indus- Chemical Co., Ltd.) and 160 parts by mass of polymethyl methacrylate (PMMA) (available from Kishida Chemical Co., Ltd.) and the mixture was stirred using a mechanical stirrer at 80° C. for 3 hours to obtain a PMMA solution having a concentration of 20% by mass.

A compound oxide dispersion, and further a film forming composition were prepared in the same manner as in Example 14 except that the PMMA solution was used instead of the AC solution.

The composition was cast on a 38 μm thick PET film subjected to releasing treatment using a micro gravure coater and passed through a 12m-drying oven at 130° C. to obtain a laminated film in which a cast film having 7.6 μm of a thickness was formed on the PET film. Subsequently, a PMMA resin film for a film capacitor having 7.6 μm of a thickness was obtained by removing the cast film from the PET film.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 4.

Example 16

A film for a film capacitor comprising a blend of PVdF and AC and having 7.5 μm of a thickness was obtained in the same manner as in Example 14 except that a combination of 45 parts by mass of a PVdF solution (containing 9 parts by mass of PVdF and 36 parts by mass of DMAc) and 5 parts by mass of an AC solution (containing 1 part by mass of AC and 4 parts by mass of DMAc) were used instead of the AC solution.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 4.

Example 17

A VdF resin film for a film capacitor having 7.5 μm of a thickness was obtained in the same manner as in Example 4 except that strontium titanate (ST-03 available from Sakai Chemical Industry Co., Ltd. 0.3 μm of average particle size) was used as highly dielectric inorganic particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 4.

Example 18

A VdF resin film for a film capacitor having 7.0 μm of a thickness was obtained in the same manner as in Example 4 except that strontium zirconium (available from Kojundo Kagaku Kabushiki Kaisha, 1 μm of average particle size) was used as highly dielectric inorganic particles.

For the obtained film, the volume resistivity, the withstanding voltage, the tensile elongation at break, and the dielectric constant and dielectric loss at frequencies (100 Hz, 1 kHz and 10 kHz) at 20° C. and 80° C. were calculated. The results are shown in Table 4.

TABLE 4

|  | Ex. 14 | | Ex. 15 | | Ex. 16 | | Ex. 17 | | Ex. 18 | |
| --- | --- | --- | --- | --- | --- | --- | --- | --- | --- | --- |
| Composition (part by mass) | | | | | | | | | | |
| Thermoplastic resin | | | | | | | | | | |
| PVdF | — | | — | | 90 | | 100 | | 100 | |
| VdF/TFE | — | | — | | — | | — | | — | |
| AC | 100 | | — | | 10 | | — | | — | |
| PMMA | — | | 100 | | — | | — | | — | |
| Highly dielectric inorganic particles | | | | | | | | | | |
| Barium calcium zirconium titanate | 175 | | 175 | | 175 | | — | | — | |
| Strontium titanate | — | | — | | — | | 175 | | — | |
| Strontium zirconate | — | | — | | — | | — | | 175 | |
| Rubber particles | | | | | | | | | | |
| No. 1 | 20 | | 20 | | 20 | | 20 | | 20 | |
| Film thickness (μm) | 7.8 | | 7.6 | | 7.5 | | 7.5 | | 7.0 | |
| Volume resistivity (Ω · cm) | | | | | | | | | | |
| (20° C.) | $3.4 \times 10^{14}$ | | $1.5 \times 10^{14}$ | | $5.6 \times 10^{14}$ | | $4.5 \times 10^{14}$ | | $1.4 \times 10^{14}$ | |
| (80° C.) | $1.7 \times 10^{14}$ | | $1.1 \times 10^{14}$ | | $2.6 \times 10^{14}$ | | $1.0 \times 10^{14}$ | | $7.1 \times 10^{13}$ | |
| Withstanding voltage (V/μm) | 280 | | 180 | | 240 | | 250 | | 240 | |
| Tensile elongation at break (%) | 15 | | 15 | | 30 | | 40 | | 40 | |
| Temperature at measurement | (20° C.) | (80° C.) | (20° C.) | (80° C.) | (20° C.) | (80° C.) | (20° C.) | (80° C.) | (20° C.) | (80° C.) |
| Dielectric constant | | | | | | | | | | |
| 100 Hz | 11 | 10 | 10 | 11 | 25 | 35 | 18 | 27 | 15 | 19 |
| 1 kHz | 10 | 9 | 9 | 9 | 24 | 30 | 17 | 23 | 14 | 18 |
| 10 kHz | 10 | 9 | 9 | 8 | 23 | 27 | 16 | 19 | 14 | 18 |
| Dielectric loss (%) | | | | | | | | | | |
| 100 Hz | 2.7 | 2.5 | 4.7 | 4.3 | 4.9 | 7.1 | 4.5 | 6.8 | 4.4 | 6.3 |
| 1 kHz | 2.6 | 2.1 | 4.1 | 4.1 | 2.6 | 9.2 | 1.9 | 8.8 | 2.3 | 8.9 |
| 10 kHz | 3.1 | 2.6 | 6.8 | 8.8 | 2.3 | 6.7 | 1.8 | 6.3 | 2.2 | 6.0 |

Table 4 shows that even when cellulose acetate (AC) is used as a thermoplastic resin (Example 14), when methyl methacrylate (PMMA) is used (Example 15) and even when a blend of PVdF and AC is used (Example 16), the required withstanding voltage and electrical insulation property are assured, and even when the highly dielectric inorganic particles are changed to strontium titanate (Example 17) or strontium zirconate (Example 18), the withstanding voltage, electrical insulating property and elongation show no significant changes.

Example 19

A laminated highly dielectric film was prepared by applying a coating composition comprising a polyester solution having a concentration of 15% by mass on one surface of the highly dielectric film obtained in Example 4 by a bar coater, followed by drying with hot air for 3 min and then preparing an insulating resin layer. The thickness of the insulating resin layer was 1.1 μm.

For the obtained laminated highly dielectric film, the volume resistivity, the withstanding voltage and the dielectric constant and dielectric loss at frequencies (100 Hz, 1 kHz and 10 kHz) at 20° C. and 80° C. were calculated. The results are shown in Table 5.

Example 20

Into 100 parts by mass of pure water, 100 parts by mass of barium calcium zirconium titanate (BCTZ available from Nippon Chemical Industrial Co., Ltd.) having 1.0 μm of an average particle size was added, and the mixture was stirred to prepare a slurry.

Into the slurry, a solution prepared by dissolving 1 part by mass of tetramethoxysilane, a compound having a low dielectric constant (3 of dielectric constant (1 kHz, 20° C.)) in DMAc (a concentration of 1% by mass) was added, and the same amount of zirconia beads having a diameter of 1 mm was added into the mixture. The resultant was charged into a bench-top planetary ball mill, followed by dispersion treatment at 800 rpm for 15 minutes under room temperature to prepare a slurry of surface-treated highly dielectric inorganic particles. The slurry was passed through a stainless steel mesh to remove zirconia beads and then dried using a vacuum dryer at 100° C. to obtain the surface-treated highly dielectric inorganic particles.

A film for a film capacitor having 7.2 μm of a thickness was obtained in the same manner as in Example 4 except that the surface-treated highly dielectric inorganic particles prepared above were used as highly dielectric inorganic particles.

For the obtained laminated highly dielectric film, the volume resistivity, the withstanding voltage and the dielectric constant and dielectric loss at frequencies (100 Hz, 1 kHz and 10 kHz) at 20° C. and 80° C. were calculated. The results are shown in Table 5.

Example 21

A laminated highly dielectric film was prepared by applying a coating composition comprising a polyester solution having a concentration of 15% by mass on one surface of the highly dielectric film obtained in Example 20 by a bar coater, followed by drying with hot air for 3 min and then preparing an insulating resin layer. The thickness of the insulating resin layer was 1.3 μm.

For the obtained laminated highly dielectric film, the volume resistivity, the withstanding voltage and the dielectric constant and dielectric loss at frequencies (100 Hz, 1 kHz and 10 kHz) at 20° C. and 80° C. were calculated. The results are shown in Table 5.

TABLE 5

| | Ex. 19 | Ex. 20 | Ex. 21 |
|---|---|---|---|
| Composition (part by mass) Thermoplastic resin | | | |
| PVdF | 100 | 100 | 100 |
| Highly dielectric inorganic particles | | | |
| Barium calcium zirconium titanate | 175 | 175 | 175 |
| Dielectric compound having low dielectric constant | | | |
| Tetramethoxysilane | — | 2 | 2 |
| Rubber particles | | | |
| No. 1 | 20 | 20 | 20 |
| Film thickness (μm) | 8.8 | 7.2 | 8.5 |
| Insulating layer (μm) | 1.1 | — | 1.3 |
| Volume resistivity (Ω · cm) | | | |
| (20° C.) | $4.2 \times 10^{15}$ | $5.8 \times 10^{14}$ | $4.4 \times 10^{15}$ |
| (80° C.) | $3.3 \times 10^{14}$ | $3.0 \times 10^{14}$ | $3.2 \times 10^{14}$ |
| Withstanding voltage (V/μm) | 300 | 260 | 300 |
| Elongation at break (%) | 45 | 39 | 46 |
| Temperature at measurement | (20° C.) (80° C.) | (20° C.) (80° C.) | (20° C.) (80° C.) |
| Dielectric constant | | | |
| 100 Hz | 15   17 | 26   34 | 14   15 |
| 1 kHz | 14   17 | 26   30 | 13   15 |
| 10 kHz | 14   16 | 25   27 | 13   14 |
| Dielectric loss (%) | | | |
| 100 Hz | 2.0   3.4 | 5.2   7.3 | 2.0   3.2 |
| 1 kHz | 1.8   3.2 | 2.7   9.8 | 1.8   3.1 |
| 10 kHz | 1.7   2.9 | 2.3   7.1 | 1.7   2.7 |

Table 5 shows that when an electrical insulation layer is further provided (Examples 19 and 21), the withstanding voltage as well as the electrical insulating property is highly improved, and when the highly dielectric inorganic particles are surface-treated with a compound having a low dielectric constant (Examples 20 and 21), the electrical insulating property is improved.

Example 22

(Preparation of a Film Capacitor)

Electrodes were formed by evaporating aluminium on both surfaces of the highly dielectric film prepared in Example 4 using a vacuum evaporator (VE-2030 available from Vacuum Device Inc.) so as to be 3 Ω/□. A lead for applying voltage was provided on the aluminum electrodes to prepare a stamp type film capacitor (for brief assessment).

The invention claimed is:

1. A highly dielectric film for a film capacitor comprising rubber particles (B) dispersed in a thermoplastic resin (A), wherein a rubber of the rubber particles (B) is at least one selected from the group consisting of acrylic rubber, butadiene rubber, silicon-acryl compound rubber, natural rubber, nitrile rubber, urethane rubber, styrene-butadiene rubber, isoprene rubber and a fluorine-containing rubber,
wherein the surface of the rubber particles (B) is coated with at least one selected from the group consisting of polymethyl methacrylate and acrylonitrile/styrene copolymer.

2. The film of claim 1, wherein the thermoplastic resin (A) comprises a vinylidene fluoride resin.

3. The film of claim 1, wherein a rubber of the rubber particles (B) is at least one selected from the group consisting of acrylic rubber and butadiene rubber.

4. The film of claim 1, wherein an average primary particle size of the rubber particles (B) is from 0.1 to 2.0 μm.

5. The film of claim 1, wherein the thermoplastic resin (A) is a vinylidene fluoride resin and a rubber of the rubber particles (B) is at least one selected from the group consisting of acrylic rubber and butadiene rubber.

6. The film of claim 1, wherein the thermoplastic resin (A) is a vinylidene fluoride resin and the rubber particles (B) are rubber particles surface-coated with at least one selected from the group consisting of polymethyl methacrylate and acrylonitrile/styrene copolymer.

7. The film of claim 1, comprising the rubber particles (B) in an amount of 1 to 30 parts by mass based on 100 parts by mass of the thermoplastic resin (A).

8. The film of claim 1, wherein the rubber particles (B) and highly dielectric inorganic particles (C) are dispersed in the thermoplastic resin (A).

9. The film of claim 8, wherein the highly dielectric inorganic particles (C) are at least one selected from the group consisting of:

(C1) compound oxide particles represented by the formula (C1):

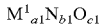

wherein $M^1$ is a metallic element of the group II; N is a metallic element of the group IV; a1 is from 0.9 to 1.1; b1 is from 0.9 to 1.1; c1 is from 2.8 to 3.2; each of $M^1$ and N may be plural, (C2) compound oxide particles represented by the formula (C2):

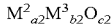

wherein $M^2$ and $M^3$ are different from each other and $M^2$ is a metallic element of the group II in Periodic Table, $M^3$ is a metallic element of the fifth period in Periodic Table; a2 is from 0.9 to 1.1; b2 is from 0.9 to 1.1; c2 is from 2.8 to 3.2, and (C3) compound oxides particles comprising at least three metallic elements selected from the group consisting of metallic elements of the group II and metallic elements of the group IV in Periodic Table.

10. The film of claim 8, comprising the rubber particles (B) in an amount of 1 to 30 parts by mass and the highly dielectric inorganic particles (C) in an amount of 10 to 300 parts by mass based on 100 parts by mass of the thermoplastic resin (A).

11. The film of claim 8, wherein a part or the whole of the highly dielectric inorganic particles (C) are surface-treated highly dielectric inorganic particles obtained by surface-treating highly dielectric inorganic particles (c1) having a dielectric constant (20° C., 1 kHz) of not less than 100 with a compound having a low dielectric constant (c2) (20° C., 1 kHz) of not more than 10.

12. A highly dielectric film for a laminated film capacitor obtained by providing an insulating resin layer on at least one surface of the highly dielectric film for a film capacitor of claim 1.

13. A film capacitor obtained by providing an electrode layer on at least one surface of the highly dielectric film for a film capacitor of claim 1.

* * * * *